United States Patent [19]

Ruminsky

[11] 4,128,854
[45] Dec. 5, 1978

[54] COMPRESSOR MINIMUM OFF-TIME SYSTEM

[75] Inventor: Robert T. Ruminsky, Minneapolis, Minn.

[73] Assignee: Honeywell Inc., Minneapolis, Minn.

[21] Appl. No.: 844,766

[22] Filed: Oct. 25, 1977

[51] Int. Cl.$^2$ .............................................. H02H 7/08
[52] U.S. Cl. ...................................... 361/22; 62/158; 318/484
[58] Field of Search .......................... 361/22; 318/484; 62/158, 231; 307/141.4

[56] References Cited

U.S. PATENT DOCUMENTS

| | | | |
|---|---|---|---|
| 3,417,290 | 12/1968 | Craddock | 361/22 |
| 3,445,725 | 5/1969 | Molen | 361/22 |
| 3,583,173 | 6/1971 | Chesebro | 62/158 |
| 3,619,668 | 8/1971 | Pinckaers | 361/22 X |
| 3,619,722 | 11/1971 | Gill et al. | 361/22 |
| 3,660,718 | 5/1972 | Pinckaers | 361/22 |
| 3,707,661 | 12/1972 | King | 318/484 |
| 3,721,866 | 3/1973 | McIntosh | 62/158 X |
| 3,721,880 | 3/1973 | Neill | 62/158 X |
| 3,742,302 | 6/1973 | Neill | 361/22 |
| 3,742,303 | 6/1973 | Dageford | 361/22 |
| 3,863,110 | 1/1975 | Bauer, Jr. | 361/22 |
| 3,864,611 | 2/1975 | Chang | 361/22 |

*Primary Examiner*—Harry E. Moose, Jr.
*Attorney, Agent, or Firm*—Alfred N. Feldman

[57] ABSTRACT

A minimum off-time protection arrangement is disclosed for compressors, particularly refrigeration type compressors. A current transformer is placed in the circuit which controls the switching of the compressor and that current transformer provides a control signal to a minimum off-time circuit. The minimum off-time circuit prevents the compressor from being restarted for some minimum period of time after once being operated.

9 Claims, 3 Drawing Figures

COMPRESSOR MINIMUM OFF-TIME SYSTEM

BACKGROUND OF THE INVENTION

In the operation of compressors, and particularly refrigeration compressors, it is very undesirable to start the compressor under load. Most refrigeration compressor equipment provides for a gradual reduction in the pressure on the high pressure side after the compressor has been inoperative for a period of time. The bleed down or reduction in high pressure allows for the subsequent restarting of the compressor against little or no pressure. If a compressor is stopped, and then restarted while the high pressure still remains, the starting torque required and the related energy drain is detrimental to the compressor and its motor. Also, there is the possibility of physically damaging the compressor by the sudden application of additional pressure when a high pressure already exists.

In order to overcome the detrimental aspects of starting a compressor under load, most refrigeration type systems warn the users not to restart the compressor for a minimum period of time. This minimum period of time normally runs in the order of three to five minutes. This warning is many times overlooked and equipment can be damaged. Also, if there is a momentary power failure, the refrigeration equipment may stop and then automatically be restarted on the restoration of power. This type of power failure occurs quite often in residential areas, and is very detrimental to the life and operating characteristics of residential compressors, particularly equipment such as central air conditioning systems. Also in connection with central air conditioning equipment, the occupants of the air condition space many times are known to reset the control thermostat. This resetting may accidentally call for the operation of the compressor in the air conditioning system only a short period after it has stopped and thereby possibly damage the compressor, as well as cause excessive dimming of lights due to the high starting current required to restart the compressor under load.

In prior art systems, this deficiency has been overcome by providing a minimum off-time delay arrangement in the form of a mechanical timer or an electronic timer that responds to the current being drawn by the compressor itself, or by an arrangement in the form of a separate minimum off-time circuit located near the contactor and responsive to voltage to the contactor. The first arrangement requires actually physically and electrically connecting into the line voltage circuits that energize the electric motor that in turn drives the compressor. This type of minimum off-time arrangement is costly and requires very skilled installation. The second, the separate minimum off-time circuit, requires mounting and wiring an additional component also. These two drawbacks, therefore, have limited the practical use of minimum off-time control devices with residential and other relatively small refrigeration compressor arrangements.

SUMMARY OF THE INVENTION

The present invention is directed to the application of a minimum off-time system to a compressor, particularly an air conditioning type or refrigeration type of compressor, by introducing the minimum off-time circuitry in the control circuit that is used to operate the compressor control switch means or compressor contactor. The present invention utilizes a very small, current transformer that is connected in series with the control circuit to the compressor control contactor to sense when the contactor has been energized. The current transformer then provides a voltage output in response to the current being drawn to thereby activate a minimum off-time circuit that is combined with a temperature control circuit to control the compressor for an air conditioning or similar type of application.

With the present invention, all of the equipment required to provide the minimum off-time function can be mounted within the enclosure of the thermostat for the control of the temperature that is affected by the compressor. Also, since the present invention is directed to the sensing of the control circuit current, the normal application of this invention would be in the low voltage circuitry for the system and would entail little or no additional expense in installation. Due to the simple nature of the present circuit, the minimum off-time protection can be either incorporated directly into the control thermostat (which is the preferred location), or can be incorporated in other control equipment associated with the general heating and cooling equipment that is normally installed in residential and small commercial installations.

Since the present invention does not involve connecting into the compressor energizing circuits, and since the equipment to carry out the present invention is quite small in physical size, the equipment disclosed in connection with the invention can be applied in a compact thermostat design in a very economical manner. Also, since only the control circuit is required for connection to the circuit of the present invention, only the normal two thermostat conductors that would typically be used for cooling control are involved. This very drastically minimizes the installation cost so that it is not significantly different than installing an ordinary or conventional cooling thermostat.

DESCRIPTION OF THE PREFERRED EMBODIMENT

Figure 1:
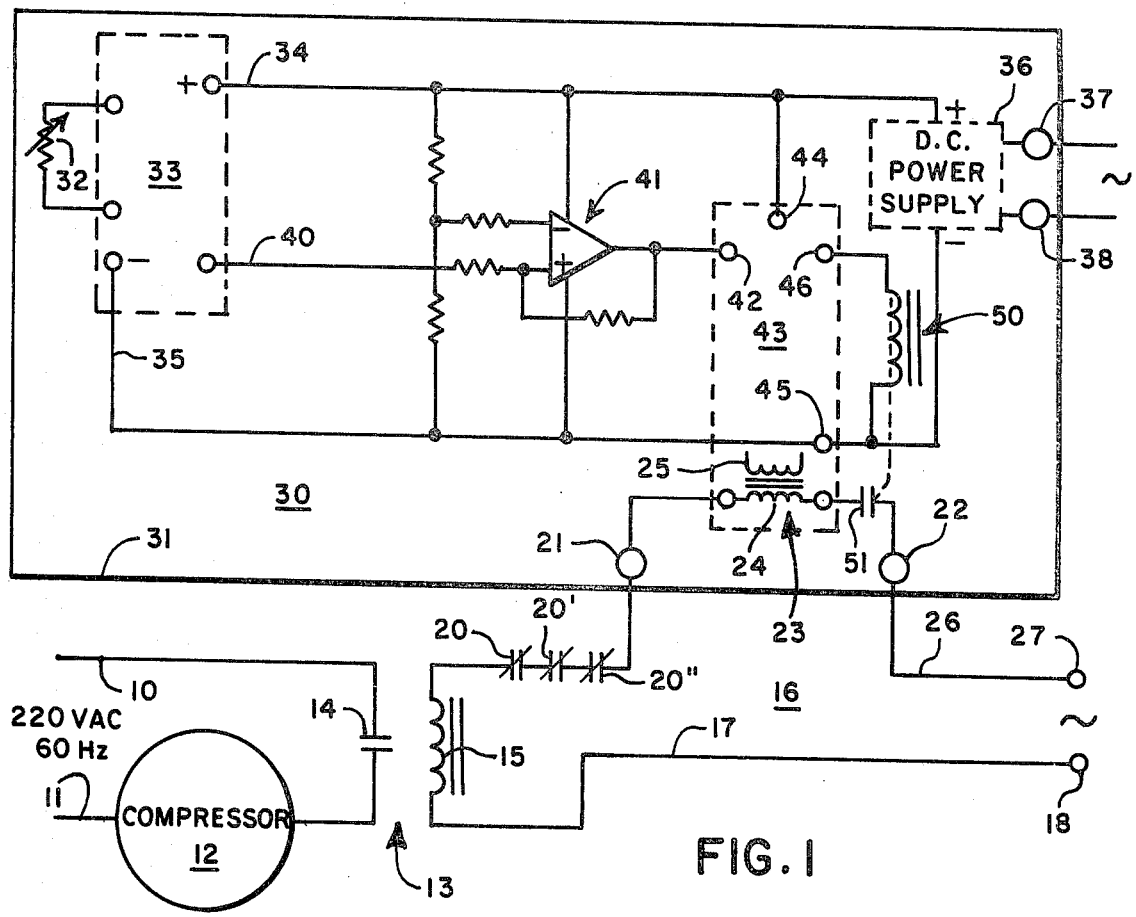
FIG. 1 is a schematic representation of the entire protection system in a block fashion, as adapted to be connected to a compressor.

In FIG. 1 there is disclosed a complete compressor protection arrangement and this disclosure includes a showing of a typical 220 volt alternating current, 60 hertz power line at 10 and 11 connected to a conventional compressor 12. The compressor 12 is controlled by a compressor control switch means generally disclosed as a contactor 13 which includes a contact 14 and a solenoid coil 15. The compressor control switch means 13 could be a solid state switching means which is gated and which would replace the contacts 14 and the solenoid coil 15.

A current conducting means generally disclosed at 16 includes a conductor 17 that is connected at one end to the solenoid coil 15 and to a terminal 18 at its other end. Also included in the current conducting means 16 are a group of normally closed switches 20, 20' and 20". The switches 20, 20' and 20" are conventional high pressure, over temperature and similar types of safety switches used in connection with the compressor 12. The current conducting means 16 further includes a pair of terminals 21 and 22 that are connected to a current transformer generally disclosed at 23 and which includes a first winding 24. The transformer 23 has a second winding 25. The current conducting means 16 includes a conductor 26 from the terminal 22 to a terminal 27 that is connected along with the terminal 18 to a source of alternating current normally used in control applications.

The terminals 21 and 22, along with the current transformer 23, are included in a condition responsive means or thermostat generally disclosed at 30 contained within an enclosure 31. The condition responsive means or thermostat 30 has a temperature responsive resistor 32 that is connected to a conventional bridge, amplifier, or related circuitry generally disclosed at 33. The circuitry 33 is energized on a conductor 34 with a positive potential and on conductor 35 by a negative or ground potential. The conductors 34 and 35 are both connected to a direct current power supply generally disclosed at 36, and the power supply is connected to terminals 37 and 38 to receive a conventional alternating current. The terminals 37 and 38 could be powered from the same source as terminals 18 and 27.

The circuitry 33, when in operation, generates a voltage on a third conductor indicated at 40 which varies with the temperature sensed by the temperature sensitive resistance 32. This voltage is fed to a switching circuit generally disclosed at 41 and which is in conventional form. The output of the amplifier 41 is connected to a terminal 42 of a minimum off-time delay circuit means generally disclosed at 43. The minimum off-time delay circuit means 43 is energized by a potential terminal 44 from the conductor 34 and at terminal 45 from the common conductor 35. A circuit configuration that is usable for the minimum off-time delay circuit means 43 will be discussed in connection with FIG. 3 where the circuitry is shown in detail. The minimum off-time delay circuit means 43 has a further terminal 46 to which is connected a switch means or relay generally disclosed at 50 which electromagnetically operates a normally open contact 51 that forms part of the current conducting means 16. The electromagnetically operated relay 50 is further connected to the common conductor 35 at the terminal 45. The electromagnetically operated relay 50 along with its contact 51 are shown, but this circuit function could be accomplished with solid state switching.

OPERATION OF FIG. 1

The operation of FIG. 1 can be understood without a detailed knowledge of the electronics contained in various elements. As such, the following description explains how the overall compressor protection arrangement utilizing a minimum off-time system can be operated. If it is initially assumed that the compressor 12 has been off for a long period of time and then is required to operate, the mode of operation can be most easily understood. The temperature responsive element 32 provides the circuitry 33 with an indication that the compressor 12 is needed for cooling purposes. This is accomplished by the application of a sufficient positive voltage on conductor 40 with respect to the voltage on conductor 35. The presence of a sufficiently positive voltage on conductor 40 causes the operational amplifier 41 to switch from a low to zero output condition to a high voltage condition thereby generally shifting the potential at the output of the operational amplifier 41 from substantially the voltage on the conductor 35 to the voltage on conductor 34. This causes the terminal 42 of the minimum off-time delay circuit means 43 to be driven high. This action immediately causes the relay means 50 to be energized closing the contact 51. At this same time, the minimum off-time delay circuit means 43 charges an internal capacitor that helps provide the minimum off-time delay.

The closing of the contact 51 connects the power between terminals 18 and 27 through the current transformer winding 24 and the normally closed switches 20, 20' and 20" to the contactor coil 15. The contactor coil 15 then closes the contact 14 to energize the compressor 12. This would be the normal run condition for a cooling or air conditioning system.

In the event of a momentary interruption of power, as by a change in the thermostat setting, a momentary power failure, or a momentary opening of any of the switches 20, 20' or 20", the compressor 12 would be deenergized. It is very undersirable to allow the compressor 12 to immediately be reenergized. The compressor 12 could be severely damaged or the electric circuitry feeding the compressor 12 could be overloaded. The fact that the contactor 13 had a current flowing in the coil 15 was sensed by the current transformer 23 as the current would have flowed in the first winding 24. The winding 25 thereby had a voltage generated that was fed into the minimum off-time delay circuit means 43 indicating to the delay circuit means 43 that the compressor was operating. The interruption, even for a moment, of this current then is used to start a timing function in the minimum off-time delay circuit means 43 which prevents the relay means 50 from being reenergized for a set period of time. This is normally in the range of three to five minutes. After the normal timing function has occurred, and if a call for the operation of the compressor 12 still remains, the minimum off-time delay circuit means 43 will allow the relay means 50 to be reenergized thereby closing the contact 51 to restart the compressor 12 after the necessary time delay. The starting of the compressor again entails a flow of current through the current transformer 23 and the system resets itself substantially immediately for another time delay function, should that function be necessary.

It will be noted that the present arrangement allows for sensing a very small current in the control circuitry for the compressor 12 by merely sensing the current flow in the compressor control switch means 13, as opposed to requiring any connection to the high voltage side of the power for the compressor 12. Further, while the condition responsive means or thermostat 30 has been shown as an electronic type of thermostat, the circuitry 33 and the amplifier 41 could be replaced by any type of temperature responsive switching means such as a bimetal operated switch of the type used in more conventional residential air conditioning control. All that is required is that the terminal 42 of the minimum off-time delay circuit means 43 be appropriately switched between the low and high voltages provided from the power supply 36. Also, the condition responsive means or thermostat 30 could be broken into more then one enclosure with the circuitry 33 forming the basic thermostat circuit in the area in which temperature control is required, and the balance of the circuitry being placed in a convenient control panel located separately from the thermostat enclosure itself.

Figure 2:
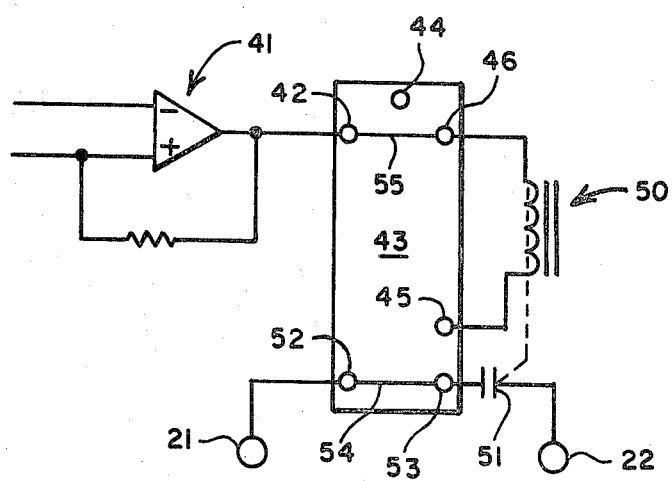
FIG. 2 shows a connection to a part of the equipment to bypass the minimum off-time feature.

In FIG. 2 there is disclosed an arrangement which shows a conventional compressor control arrangement which would bypass the minimum off-time delay circuit arrangement. The amplifier 41 is again shown along with the minimum off-time delay circuit means 43 and its associated terminals 42, 44, 46, 45 and two terminals that have not been previously designated 52 and 53. The terminals 52 and 53 had the first winding 24 of transformer 23 connected across them. In the disclosure in FIG. 2, the terminals 52 and 53 are jumpered by a conductor 54 while the terminals 42 and 46 are jumpered by a conductor 55. The arrangement shown in FIG. 2 indicates how the minimum off-time delay circuit means 43 could be conveniently bypassed if that feature were not needed in a system in which the invention has been encompassed. The delay feature could readily be avoided merely by the addition of the pair of jumpers 54 and 55 which would allow the amplifier 41 to directly control the relay means 50 to in turn control the contact 51 and thereby control the compressor without the minimum off delay circuit means function, if that was desirable. The disclosure of FIG. 2 has been provided merely to show the flexibility in adding or subtracting the invention to a conventional system.

Figure 3:
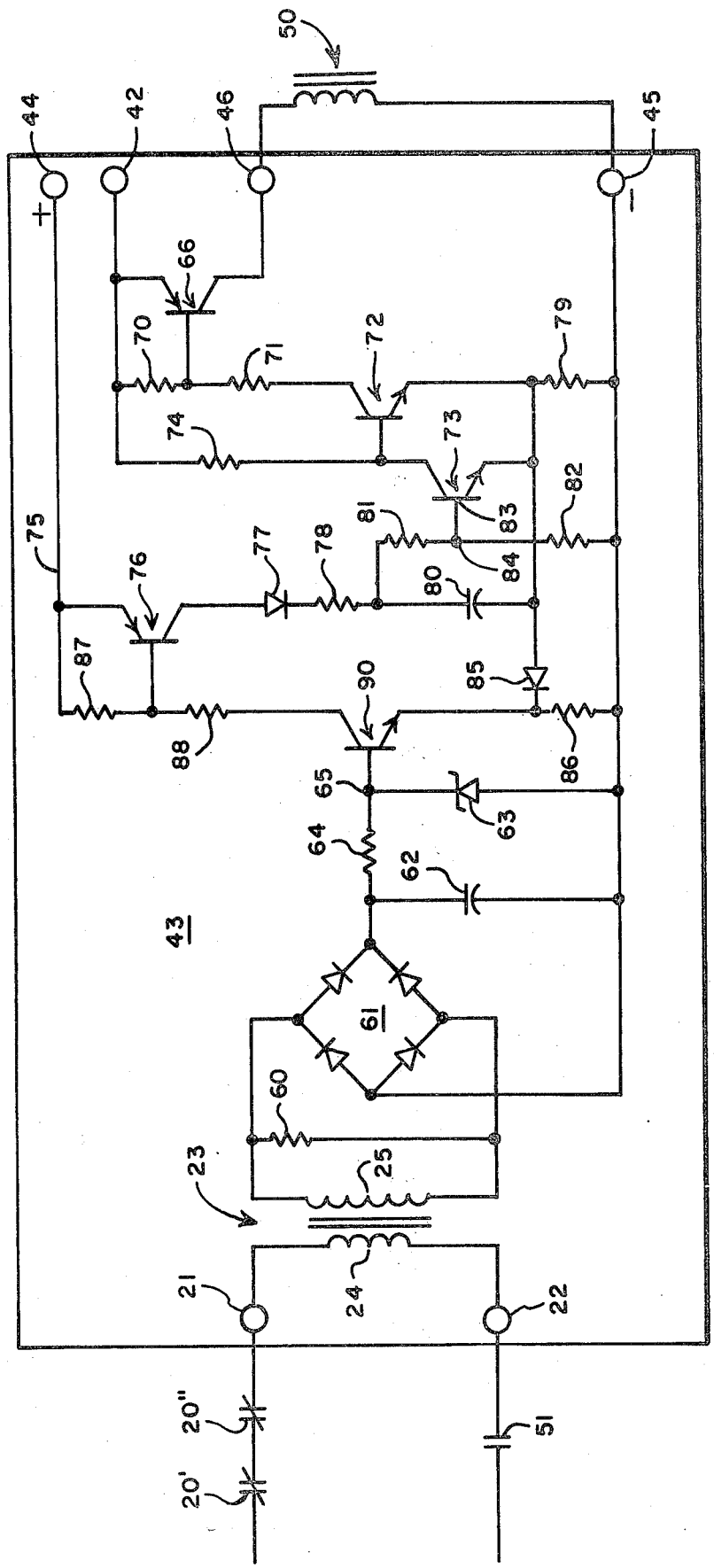
FIG. 3 is a circuit diagram of one possible minimum off-time circuit that can be used in the present invention.

In FIG. 3 the minimum off-time delay circuit means 43 is shown in detail. This is one configuration of time delay circuitry that can be used, but the invention is not limited to this particular circuitry. The circuitry has been shown merely as one way in which to carry out the novel compressor protection arrangement with a minimum off-time system.

In FIG. 3 again the limits 20' and 20" are shown connected to the terminals 21 and 22 along with the relay contact 51. The terminals 21 and 22 are connected to the current transformer 23 and the terminals 21 and 22 provide for the connection of the first winding 24. The second winding 25 is connected along with a resistor 60 to a full-wave bridge shown at 61 where the voltage that is generated across the winding 25 is rectified and supplied to a capacitor 62 and a zener diode 63. The bridge 61, capacitor 62, a resistor 64 and the zener diode 63 allow a voltage to appear at point 65 whenever current is flowing in the current transformer winding 24. The voltage at point 65 is used as the set mechanism or voltage which tells the minimum off-time delay circuit means 43 that the compressor is operating. The delay circuit means terminals 44, 42, 46 and 45 are again shown with the relay means 50 connected across the terminals 45 and 46. A direct current potential from the power supply 36 is connected to the terminal 44 and is shown by a positive plurality sign. The terminal 42 is connected to the output of the switch or amplifier means 41. The terminal 42 is connected through a transistor generally disclosed at 66 to the terminal 46 so that whenever the transistor 66 is conducting the relay means 50 will be energized. The transistor 66 is controlled by a voltage divider network made up of resistors 70, 71, transistor 72 and a resistor 79 along with the resistor 74. This control arrangement is further implemented by the transistor 73. The function of the transistors and their operating modes will be described after the circuitry has been described in total.

Connected to the terminal 44 is a conductor 75 that is connected to a further transistor 76, a diode 77, a resistor 78 and the time delay capacitor 80. Connected between the junction of the resistor 78 and the capacitor 80 is a voltage divider network made up of the resistors 81 and 82 which control the base 83 of the transistor 73 from the voltage at the junction 84 between the resistors 81 and 82. The capacitor 80 is further connected by a diode 85 to a small resistance 86. The present circuitry is completed by a further network including the resistors 87 and 88 along with the transistor generally disclosed at 90.

OPERATION OF FIG. 3

It is initially assumed that everything has been off for a period of time except the voltage at terminal 44 which is supplied from the direct current power supply 36 of FIG. 1. When the thermostat 30 calls for cooling, the voltage at terminal 42 rises sharply. This provides a base drive for the transistor 72 through the resistor 74 and this turns "on" the transistor 72. As soon as transistor 72 conducts, a voltage is dropped across resistors 70, 71 and 79. This immediately turns "on" the transistor 66 which supplies the necessary current to pull in the relay means 50. As soon as the relay means 50 is energized, the relay contact 51 closes and the compressor 12 of FIG. 1 is energized. This immediately causes a current to flow in the winding 24 of the current transformer 23 and this current is reflected in the winding 25 as a voltage which is rectified by the bridge 61 and supplied as a voltage at the junction 65. The transistor 90 is driven into a saturated state of conduction. This immediately develops a voltage across the resistors 87, 88 and 86 to drive the transistor 76 into a saturated state of conduction whereby current flows through the diode 77 and the resistor 78 to charge the capacitor 80 in approximately one second. The resistors 79 and 86 are selected so that the diode 85 is reversed biased. Also, the resistors 81 and 82 are chosen such that when the capacitor 80 is fully charged and the transistor 72 is conducting, the base-emitter junction of transistor 73 is reversed biased, thus keeping the transistor 73 "off". At this point the relay means 50 is energized and current is flowing to the contactor coil through the winding 24. One of two conditions can now occur. The temperature control signal at terminal 42 can be interrupted representing a normal control cycling or someone suddenly changing the set point of the thermostat, or the current flowing in the winding 24 can be interrupted because of an external limit switch such as switch 20' or 20" opening.

First, the consider the loss of the control signal at the terminal 42. When this occurs, the relay means 50 will become deenergized and the contact 51 will open. This also immediately interrupts the current that has been flowing through the transistor 72 and most of the voltage that has been appearing across the resistor 79 will disappear. This allows the base-emitter junction of the transistor 73 to be forward biased and the capacitor 80 will start to discharge through the resistor 81 and the base-emitter junction of the transistor 73. There is also an auxiliary path of discharge through the resistors 81, 82, and 79.

If for some reason the control signal applied to terminal 42 had been just momentarily interrupted, such as when a person abruptedly charnges the thermostat setting, then the capacitor 80 is still discharging and the transistor 73 is still in a conductive state. The transistor 73 will be saturated "on" and will prevent the transistor 72 from becoming conductive and hence preventing the control relay means 50 from being reenergized. The relay means 50 will pull back in only when the capacitor 80 discharges to the point where the transistor 73 has turned "off". The discharge time period for the capacitor 80 is the minimum off-time for the system and is normally selected to be approximately five minutes.

The second condition of interruption of current to the compressor 12 that was previously mentioned was the loss of current through the winding 24 of the current transformer 23. This would occur due to a high pressure condition or a high temperature condition in the compressor 12 that is protected against by the operation of one of the switches 20, 20′ or 20″. Under these conditions the temperature control signal is still present and the terminal 42 thereby has a voltage which would tend to keep the relay means 50 energized. When the current flowing through the winding 24 disappears due to the opening of one of the limit switches, the voltage at point 65 on the base of the transistor 90 also disappears and the transistor 90 is turned "off". The voltage across the resistance 86 then immediately drops and the diode 85 is forward biased. The voltage across the resistance 79 is reduced sufficiently to allow the transistor 73 to conduct. This turn "off" the transistors 66 and 72 which in turn immediately deenergizes the relay means 50 thereby opening the contact 51. The relay means 50 will remain deenergized as long as the capacitor 80 is in a discharging mode thereby keeping the transistor 73 conducting, as was indicated in the previous example of operation. Even if the external limit that had opened now closes, there will be no current flow in the winding 24 because the relay contact 51 is now open and will be held open as long as the minimum off-time delay function occurs.

The specific electronics disclosed in the minimum off-time delay circuit means 43 is not material to the present invention. The exact circuit configuration of the minimum off-time delay circuit means 43 can vary extensively and only is limited by the concept of utilizing the current transformer voltage and an appropriate time delay network to control the relay means 50. As has been previously mentioned, the relay means 50 and its contact 51 could be in a form of a solid state relay as opposed to the electromechanical relay that has been specifically disclosed.

Since there are a number of possible condition responsive means or thermostats 30 that are capable of generating the necessary signal for the minimum off-time delay circuit means 43, and the fact that there are a number of possible electronic circuits which could be used for the minimum off-time delay circuit means 43, the applicant wishes to be limited in the scope of his invention solely by the scope of the appended claims.

The embodiments of the invention in which an exclusive property or right is claimed are defined as follows:

1. A compressor protection arrangement utilizing a minimum off-time system to insure that a compressor is kept deenergized for a minimum period of time in the event that it becomes deenergized for any reason, including: compressor control switch means including current conducting means adapted to control said compressor in response to condition responsive means; said current conducting means including current transformer means having a first transformer winding connected to sense the flow of current which is controlling said compressor switch means; a second winding of said current transformer means having a voltage output when said first winding has a current flow indicating that said compressor is energized; and minimum off-time delay circuit means connected to said second winding and controlled thereby to initially energize said compressor control switch means upon said condition responsive means requiring the operation of said compressor; said minimum off-time circuit means responsive to a loss of said current in said second transformer winding to keep said compressor deenergized for a minimum period of time regardless of the state of said condition responsive means.

2. A compressor protection arrangement as described in claim 1 wherein said condition response means is temperature control means.

3. A compressor protection arrangement as described in claim 2 wherein said temperature control means includes a temperature response resistance element to vary the output of said temperature control means in response to the temperature at said resistance element.

4. A compressor protection arrangement as described in claim 3 wherein said compressor control means is an electromagnetically operated contactor.

5. A compressor protection arrangement as described in claim 4 wherein said current conducting means includes a relay contact with said relay contact controlled by a relay coil operated by said minimum off-time delay circuit means.

6. A compressor protection arrangement as described in claim 5 wherein said current conducting means further includes compressor safety switch means capable of being operated to protect the compressor.

7. A compressor protection arrangement as described in claim 2 wherein said temperature control means, said current transformer means, and said minimum off-time delay circuit means are mounted in an enclosure to form a thermostat.

8. A compressor protection arrangement as described in claim 7 wherein said temperature control means includes a temperature response resistance element to vary the output of said temperature control means in response to the temperature at said resistance element.

9. A compressor protection arrangement as described in claim 8 wherein said current conducting means includes a relay contact with said relay contact controlled by a relay coil operated by said minimum off-time delay circuit means.

* * * * *